(12) United States Patent
Itoh et al.

(10) Patent No.: US 7,477,407 B2
(45) Date of Patent: Jan. 13, 2009

(54) CONFOCAL OPTICAL DEVICE AND SPHERICAL-ABERRATION CORRECTION METHOD

(75) Inventors: Tatsuo Itoh, Osaka (JP); Teruhiro Shiono, Osaka (JP); Kazuya Hisada, Osaka (JP)

(73) Assignee: Panasonic Corporation, Osaka (JP)

( * ) Notice: Subject to any disclaimer, the term of this patent is extended or adjusted under 35 U.S.C. 154(b) by 213 days.

(21) Appl. No.: 11/268,663

(22) Filed: Nov. 8, 2005

(65) Prior Publication Data
US 2006/0098213 A1    May 11, 2006

(30) Foreign Application Priority Data
Nov. 8, 2004   (JP) .............................. 2004-323350
Sep. 28, 2005  (JP) .............................. 2005-281757

(51) Int. Cl.
*G01B 11/28* (2006.01)
(52) U.S. Cl. ...................................................... 356/630
(58) Field of Classification Search ................. 356/630, 356/632, 123; 369/44.27, 44.23
See application file for complete search history.

(56) References Cited

U.S. PATENT DOCUMENTS

| | | | | |
|---|---|---|---|---|
| 4,844,617 A * | 7/1989 | Kelderman et al. | .......... | 356/624 |
| 6,229,600 B1 * | 5/2001 | Martynov | .................... | 356/123 |
| 6,567,365 B1 * | 5/2003 | Hendriks et al. | ....... | 369/112.02 |
| 6,967,916 B2 * | 11/2005 | Sano et al. | ................ | 369/53.12 |
| 7,042,817 B2 * | 5/2006 | Tadano et al. | ............ | 369/44.23 |
| 7,206,277 B2 * | 4/2007 | Ogasawara et al. | .... | 369/112.12 |
| 7,224,645 B2 * | 5/2007 | Ando et al. | .............. | 369/44.23 |
| 7,277,365 B2 * | 10/2007 | Yasuda et al. | ............ | 369/44.27 |
| 2003/0107961 A1 * | 6/2003 | Yasuda et al. | ............ | 369/44.27 |

FOREIGN PATENT DOCUMENTS

JP    5-134186    5/1993
JP    10-122826   5/1998

* cited by examiner

*Primary Examiner*—Tarifur R. Chowdhury
*Assistant Examiner*—Isiaka O Akanbi
(74) *Attorney, Agent, or Firm*—Wenderoth, Lind & Ponack L.L.P.

(57) ABSTRACT

A confocal optical device and a spherical-aberration correction method reduce the generation of spherical aberration. This confocal optical device includes a drive mechanism which moves a sample board to change the distance between an objective lens and the sample board. A spherical-aberration correction element is disposed between a light source and the objective lens. A reference-position detection section, based on a detection result by a photo-detector, detects the position of the sample board when the focal position of the objective lens coincides with the surface of the sample. A movement-distance derivation section, based on a detection result by the photo-detector, calculates a distance by which the sample board is moved until the focal position of the objective lens coincides with an object to be measured inside of the sample, and derives the depth at which the measured object is located in the sample. A correction control section controls the spherical-aberration correction element according to the inside-sample depth of the measured object.

20 Claims, 8 Drawing Sheets

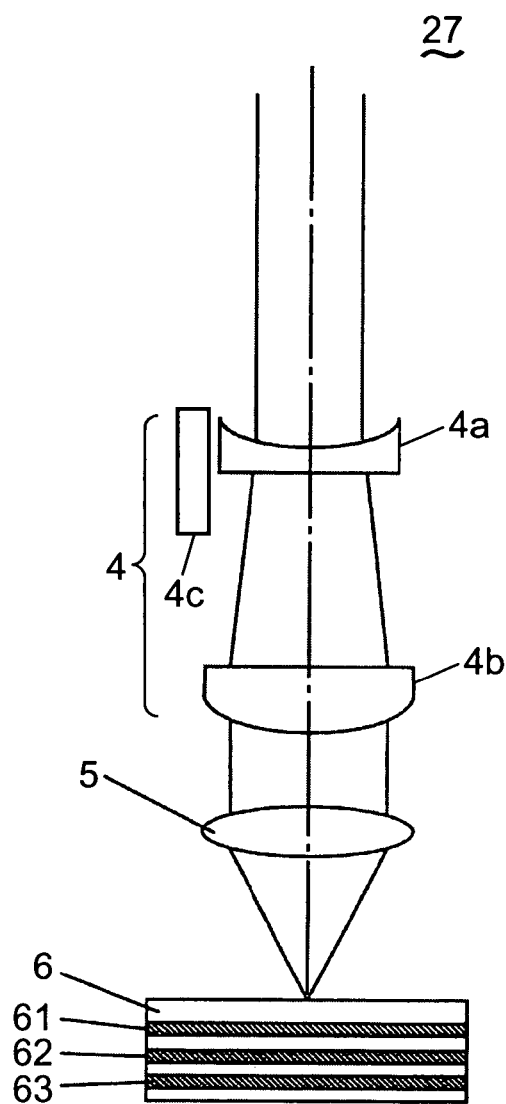
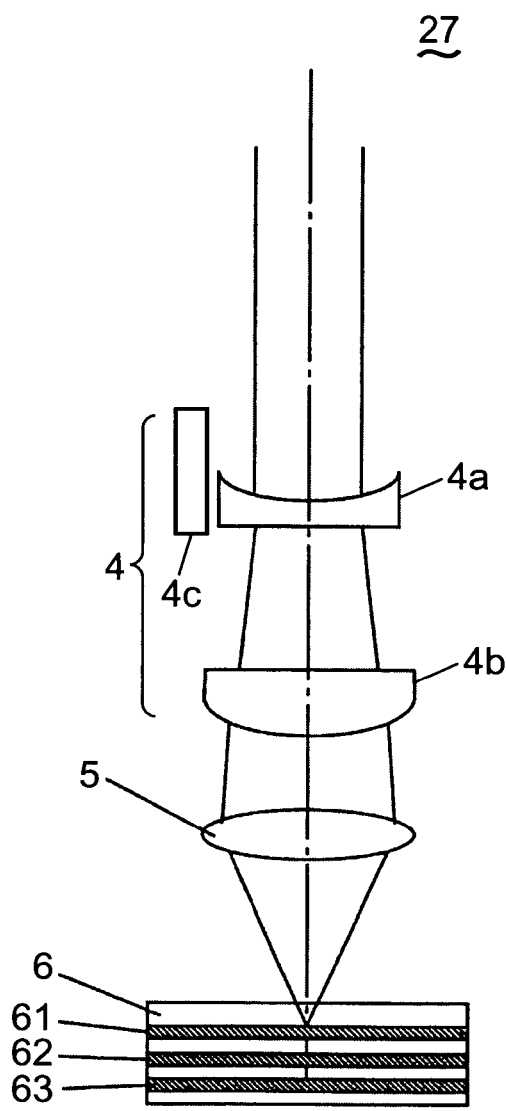

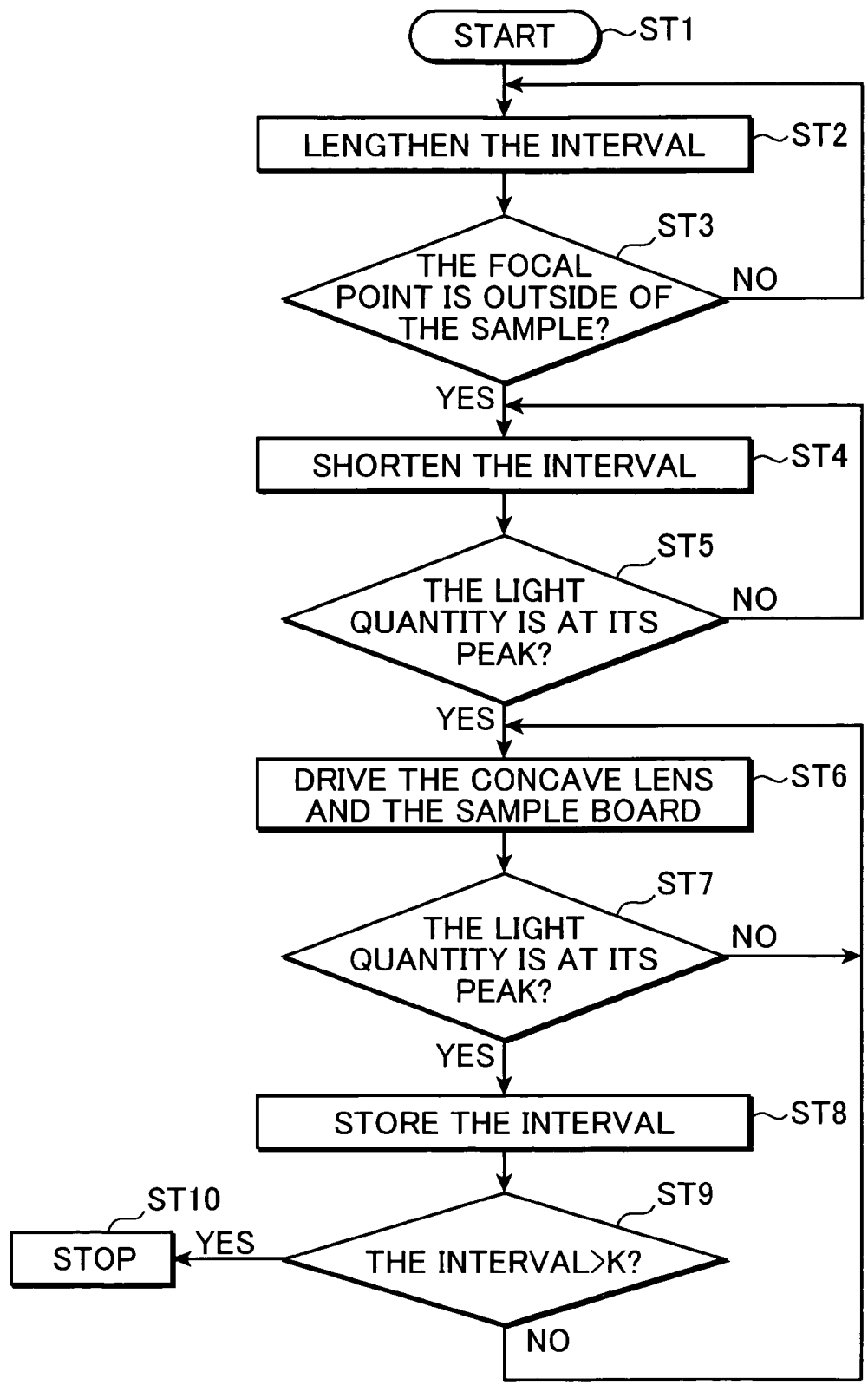

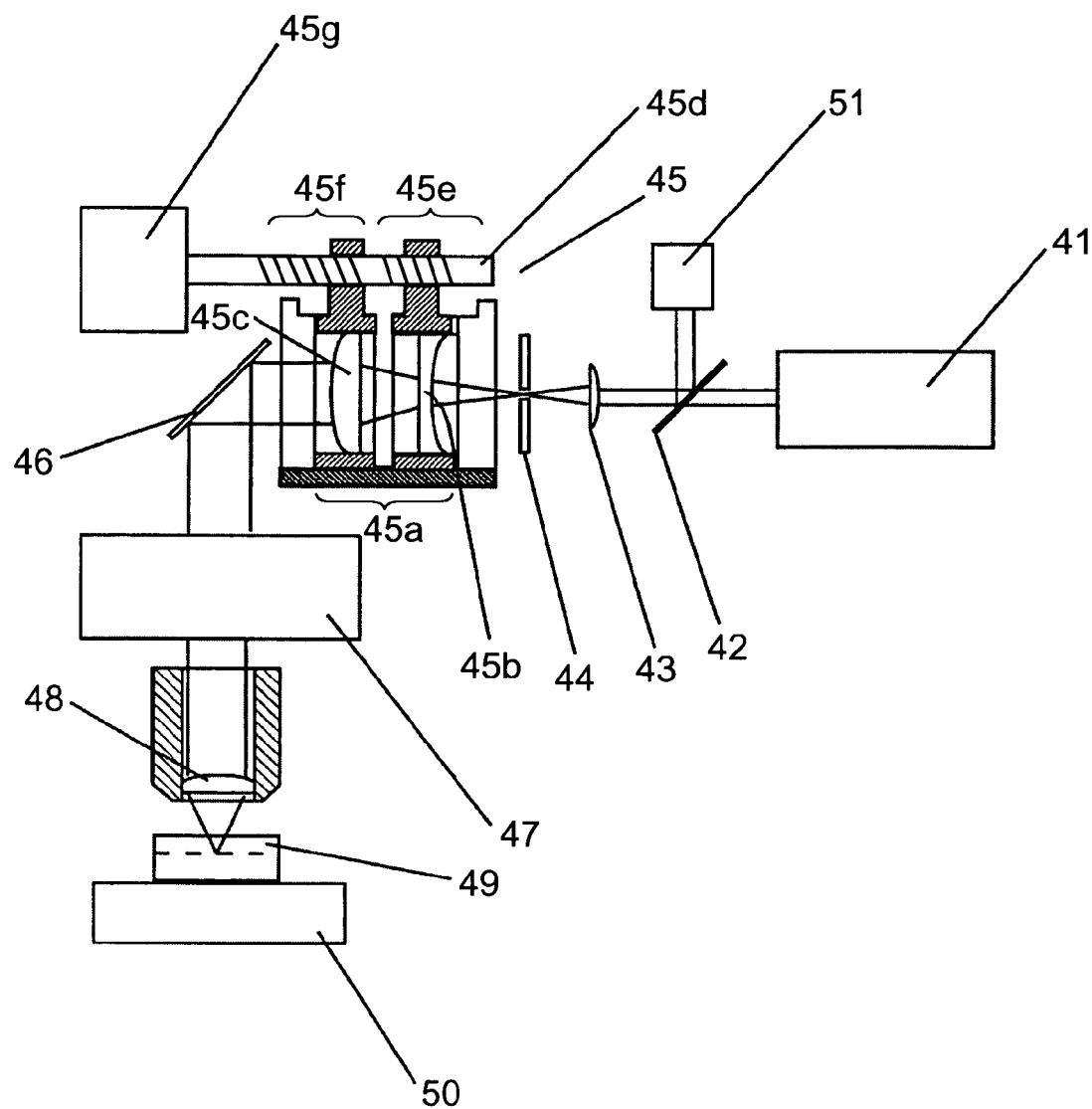

CONFOCAL OPTICAL DEVICE AND SPHERICAL-ABERRATION CORRECTION METHOD

BACKGROUND OF THE INVENTION

1. Field of the Invention

The present invention relates to a confocal optical device, a spherical-aberration correction method, a film-thickness measurement apparatus, a film-thickness measurement method, a shape measurement apparatus and a shape measurement method.

2. Description of the Related Art

A confocal optical device has a precise resolving power in the directions of an optical axis. Hence, it is used for three-dimensional measurement of transparent subjects or laser microscopy. For example, it is used to measure the thickness of a cover-glass layer in an optical disk, or measure the thickness of a cover-glass layer and an intermediate layer in a double-layer optical disk.

A conventional confocal optical device will be described using FIG. 9. FIG. 9 shows the configuration of a conventional confocal optical device which is described in Japanese Patent Laid-Open No. 5-134186 specification. As shown in FIG. 9, a beam of light which is emitted from a laser light source 41 passes through a light-branching element 42. Then, it concentrates through a first lens group 43 and passes through a pinhole 44. This pinhole 44 is provided at the focal point of the first lens group 43. Then, the beam of light which has passed through this pinhole 44 is incident upon a beam expander 45.

The beam expander 45 includes a second lens group 45a, drive means 45d, 45e, 45f, and a motor 45g. The second lens group 45a includes a concave lens 45b and a convex lens 45c. Then, in the beam expander 45, the position of each lens which makes up the second lens group 45a is shifted by the drive means 45d, 45e, 45f, and the motor 45g. Thereby, a beam of light which is emitted from the beam expander 45 is designed to diverge or converge. The beam of light which has passed through the beam expander 45 is reflected by a mirror 46. Then, it passes through a scanning optical system 47 and is incident upon an objective lens 48. The beam of light which has come into this objective lens 48 concentrates upon the inside of a sample 49 which is fixed on a sample board 50. Herein, the scanning optical system 47 is used to scan a beam on the perpendicular plane to the optical axis.

The beam of light which is reflected from the inside of the sample 49 propagates in the direction opposite to what is described above in the optical system. Then, it passes through the pinhole 44. At this time, only the reflected beam of light from the focal point of the objective lens 48 and its vicinity passes through the pinhole 44. This is because a confocal optical system has such a function, which is generally known. The beam of light which has passed through the pinhole 44 branches off at the light-branching element 42. Then, it is detected by a photoelectric detection element 51. The photoelectric detection element 51 outputs an electric signal according to the quantity of a beam of light which it receives.

The position of each lens of the above described beam expander 45 is changed, so that a beam of light incident upon the objective lens 48 can be turned into a divergent beam of light or a convergent beam of light. Thereby, the point of a beam of light which is concentrated by the objective lens 48 can be scanned in the optical-axis directions inside of the sample 49. Specifically, if the second lens group 45a is moved to the side of the pinhole 44, an incident beam of light upon the objective lens 48 becomes a divergent beam of light. Thus, the concentrated-light point moves to the side away from the objective lens 48. On the other hand, if the second lens group 45a is moved to the side of the objective lens 48, an incident beam of light upon the objective lens 48 becomes a convergent beam of light. Thus, the concentrated-light point moves to the side close to the objective lens 48. This makes it possible to observe the inside of the sample 49 from its deep part to the shallow part. In this case, if a beam of light incident upon the objective lens 48 is transformed into a divergent beam of light or a convergent beam of light, a spherical aberration is produced. But this spherical aberration is designed to be offset by changing the distance between the concave lens 45b and the convex lens 45c which make up the second lens group 45a.

However, in the confocal optical device according to the above described Japanese Patent Laid-Open No. 5-134186 specification, there is still room to correct a spherical aberration more precisely. Specifically, in this confocal optical device, a beam of light incident upon the objective lens 48 is turned into a divergent beam of light or a convergent beam of light. Thereby, the position of a concentrated-light point of the incident beam of light varies according to the depth directions inside of the sample 49. Therefore, the spherical aberration which is generated when a beam of light is transmitted into the sample 49 changes, depending upon the depth at which the concentrated-light point is located in the sample 49. In such a confocal optical device, the fact that a spherical aberration is affected by the depth inside of the sample 49 is left out of account. Hence, when the focal point is brought to a desired depth, this spherical aberration which is affected by the depth inside of the sample 49 cannot be reduced.

BRIEF SUMMARY OF INVENTION

In view of the aforementioned disadvantage, it is an object of the present invention to provide a confocal optical device and a spherical-aberration correction method which are capable of reducing the generation of a spherical aberration.

In order to attain the above described object, a confocal optical device according to the present invention, in which an objective lens concentrates a beam of light that is emitted from a light source upon the inside of a sample on a sample board, a detection lens concentrates a beam of light that is reflected from the sample so that the beam of light passes through a pinhole, and a photo-detector detects the beam of light, comprises a drive mechanism which moves either of the objective lens and the sample board so that the distance is changed between the objective lens and the sample board. A spherical-aberration correction section is disposed between the light source and the objective lens. A reference-position detection section, based on a detection result by the photo-detector, detects the position of the objective lens or the sample board when the focal position of the objective lens coincides with the surface of the sample. A movement-distance derivation section, based on a detection result by the photo-detector, calculates a distance by which the objective lens or the sample board is moved until the focal position of the objective lens coincides with an object to be measured inside of the sample, and derives the depth at which the measured object is located in the sample. A correction control section controls the spherical-aberration correction section according to the inside-sample depth of the measured object.

In addition, a spherical-aberration correction method according to the present invention, in which a spherical aberration is corrected which is generated when an objective lens concentrates a beam of light that is emitted from a light source upon the inside of a sample on a sample board, comprises the steps of: a detection lens concentrating a beam of light that is reflected from the sample so that the beam of light passes through a pinhole, and a photo-detector detecting the beam of light; moving either of the objective lens and the sample board so that the distance is changed between the objective lens and the sample board, and based on a detection result by the photo-detector, detecting the position of the objective lens or the sample board when the focal position of the objective lens coincides with the surface of the sample; further moving the objective lens or the sample board, and based on a detection result by the photo-detector, detecting the position of the objective lens or the sample board when the focal position of the objective lens coincides with an object to be measured inside of the sample; deriving the depth at which the measured object is located in the sample, from the position when the focal position coincides with the surface of the sample and the position when the focal position coincides with the measured object; and correcting the spherical aberration according to the inside-sample depth of the measured object.

According to the present invention, a spherical aberration is corrected according to the depth at which an object to be measured is located in a sample. Therefore, a spherical aberration which is generated when a beam of light goes into the sample can also be corrected.

These and other objects, features and advantages of the present invention will become more apparent upon reading of the following detailed description along with the accompanied drawings.

BRIEF DESCRIPTION OF THE DRAWINGS

FIG. 2A is a schematic view of the film-thickness measurement apparatus, showing a spherical-aberration correction in a state where the focal point of an objective lens is coincident with the surface of a multi-layer optical disk. FIG. 2B is a schematic view of the film-thickness measurement apparatus, showing a spherical-aberration correction in a state where the focal point of the objective lens is inside of the multi-layer optical disk.

FIG. 3 is a flow chart, showing an operation algorithm for the film-thickness measurement apparatus according to the first embodiment of the present invention.

FIG. 9 is a schematic view of a conventional confocal optical device.

DETAILED DESCRIPTION OF INVENTION

Hereinafter, the best mode for embodying the present invention will be described in detail with reference to the attached drawings.

First Embodiment

Figure 1:
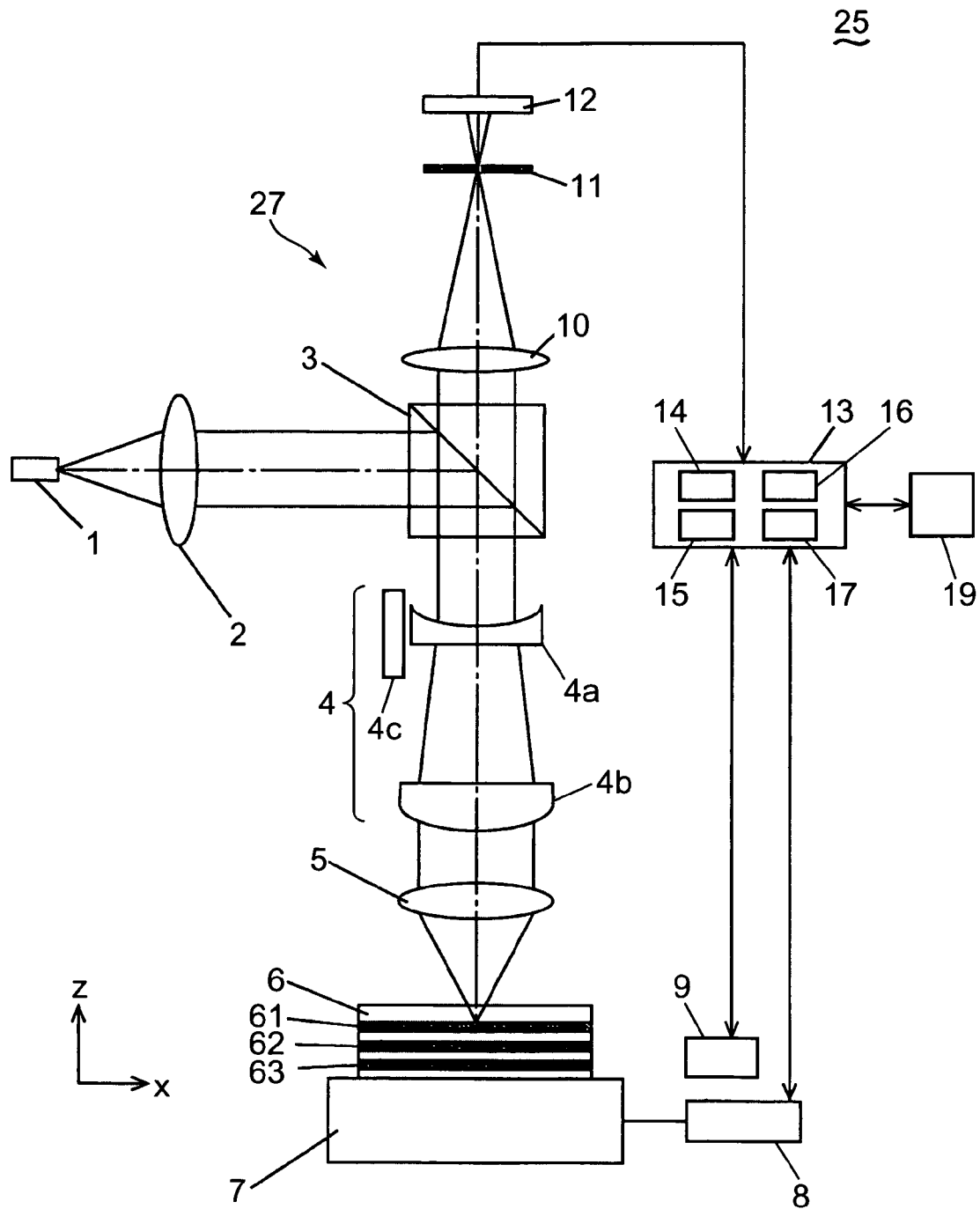
FIG. 1 is a schematic view of a film-thickness measurement apparatus according to a first embodiment of the present invention.

FIG. 1 shows an embodiment of the film-thickness measurement apparatus to which the confocal optical device according to the present invention is applied. As shown in FIG. 1, a film-thickness measurement apparatus 25 includes a confocal optical device 27 and a film-thickness derivation section 19. The confocal optical device 27 includes: a laser light source 1; a collimating lens 2; a light-branching element 3; a spherical-aberration correction element 4 as an example of the spherical-aberration correction section; an objective lens 5; a sample board 7; a drive mechanism 8; a detection lens 10; a pinhole 11; and a photo-detector 12.

The laser light source 1 is comprised of a semiconductor laser which emits a laser beam. A laser beam has a wavelength of 650 nm or 405 nm. The shorter the wavelength of a laser beam becomes, the more precise measurement can be taken.

The collimating lens 2 transforms a divergent beam which is emitted from the laser light source 1 into a parallel beam. The light-branching element 3 reflects the laser beam which has passed through the collimating lens 2. It also transmits the beam of light which has returned from a sample.

The spherical-aberration correction element 4 is disposed between the light-branching element 3 and the objective lens 5. In this embodiment, this spherical-aberration correction element 4 is a beam expander. Specifically, the spherical-aberration correction element 4 includes a concave lens 4a, a convex lens 4b, and a drive section 4c. The concave lens 4a is designed to be moved, by the drive section 4c, in the directions of an optical axis. In contrast, the convex lens 4b is fixed so that its position remains unchanged. The spherical-aberration correction element 4 is placed so that the convex lens 4b is located on the side of the objective lens 5 with respect to the concave lens 4a. Hence, at an initialization time before the start of a measurement, a laser beam which is emitted from the convex lens 4b and goes toward the objective lens 5 is set to become a parallel beam. Then, if the concave lens 4a moves to the side of the convex lens 4b, the beam which is emitted from the convex lens 4b turns into a divergent beam. On the other hand, if the concave lens 4a moves to the opposite side to the convex lens 4b, the emitted beam from the convex lens 4b is transformed into a convergent beam.

In this embodiment, the objective lens 5 is designed so that a spherical aberration becomes the minimum when an incident parallel beam forms a focal point in the air. On the above described sample board 7, a sample is placed. This sample is, for example, a multi-layer optical disk 6 which has a plurality of layers. In this multi-layer optical disk 6, several record layers 61, 62, 63 are included. The layers between the record layers are transparent layers, and the outermost layer is, for example, a cover-glass layer which is made of a polycarbonate. Taking into account a spherical aberration in the multi-layer optical disk 6 with twenty to thirty layers, the distance between the record layers 61, 62, 63 is 5 μm or below. Preferably, it should be equal to, or longer than, 2 μm. If the layer interval is shorter than 2 μm, its film-thickness tolerance for manufacturing is almost impossible to secure. This makes it difficult to manufacture it. If the numerical aperture of the objective lens 5 is set at 0.8 or above, then from the result of a simulation, a resolving power in the optical-axis directions can be 0.7 μm or below. Therefore, when the multi-layer optical disk 6 is used as the sample, it is preferable that the numerical aperture of the objective lens 5 be 0.8 or above.

The sample board 7 can be moved, using the drive mechanism 8, in the optical-axis directions of the objective lens 5. The sample board 7 is movable within the range from a position below the focal point of the objective lens 5 up to a position closer to the objective lens 5 than the focal point is. The drive mechanism 8 is configured so as to control the movement distance of the sample board 7, for example, by controlling the drive of a motor (not shown).

The movement distance of the sample board 7 is measured by a displacement transducer 9 as a displacement measuring means. The displacement transducer 9 is formed by a contact displacement transducer, a non-contact displacement transducer in which a laser beam is used, or the like. It is fixed in a predetermined position.

The above described pinhole 11 is placed on the opposite side to the objective lens 5 with respect to the light-branching element 3. This pinhole 11 lies on the optical axis of the objective lens 5. The above described detection lens 10 is located between the light-branching element 3 and the pinhole 11. The detection lens 10 collects a beam of light which branches from the light-branching element 3. Then, the pinhole 11 is in the focal position of the detection lens 10. In other words, the pinhole 11 is in the conjugate position of the objective lens 5's focal point. The photo-detector 12 detects a beam of light which passes through the pinhole 11, and then, it outputs an electric signal according to the quantity (or intensity) of a beam of light which it receives.

The confocal optical device 27's resolving power in its optical-axis directions depends upon the numerical aperture of the objective lens 5, the magnification of the confocal optical device 27 and the diameter of the pinhole 11. For example, let's assume the wavelength of a laser beam which is emitted from the laser light source 1 is 0.65 μL m, and that the numerical aperture of the objective lens 5 is 0.8. In this case, the Airy-disk diameter of the objective lens 5 which is given as 1.22×(wavelength)/(numerical aperture) is approximately 1 μm. Then, if the confocal optical device 27 has a magnification of 50, the Airy-disk diameter on the pinhole 11 is 50 μm. At this time, if the diameter of the pinhole 11 is about the triple of the Airy-disk diameter or 150 μm, the resolving power in the optical-axis directions is 2 μm. If the diameter of the pinhole 11 is set to about the triple of the Airy-disk diameter or 150 μm, the positional adjustment of the pinhole 11 and the detection lens 10 can be easily made. This also makes it possible to widen the range within which the pinhole 11 can be allowed to be moved by a temperature change, a vibration or the like. On the other hand, in an environment where the ambient temperature is managed within a fixed range and a vibration is removed, the diameter of the pinhole 11 is set to once as long as the Airy-disk diameter, or 50 μm. Thereby, the resolving power in the optical-axis directions becomes 0.7 μm. This makes it possible to make a thorough resolution and take a measurement, despite a layer interval of 2 μm.

The confocal optical device 27 is provided with an aberration correction controller 13 which controls the spherical-aberration correction of a laser beam which is collected by the objective lens 5. A signal which is outputted from the photo-detector 12 and a signal which is outputted from the displacement transducer 9 are inputted in this aberration correction controller 13.

The aberration correction controller 13 includes as its functions: a drive control section 14; a reference-position detection section 15; a movement-distance derivation section 16; and a correction control section 17. The drive control section 14 controls the drive mechanism 8, and thereby, controls the distance which the sample board 7 moves in the optical-axis directions of the objective lens 5.

On the basis of the output of the photo-detector 12 and the output of the displacement transducer 9, the reference-position detection section 15 detects the position (i.e., reference position) of the sample board 7 at the time when the objective lens 5's focal position meets the surface (i.e., upper surface) of the sample. Specifically, when the focal point of a laser beam which is collected by the objective lens 5 meets the surface of the multi-layer optical disk 6, a beam of light which is reflected from this surface focuses on the pinhole 11. Therefore, when the laser beam's focal point coincides with the surface of the multi-layer optical disk 6, it passes through the pinhole 11. Then, a peak appears in the quantity (or intensity) of a received beam which is detected by the photo-detector 12. At this time, if the position of the sample board 7 is detected, the reference position of the sample board 7 can be detected.

On the basis of the output of the photo-detector 12 and the output of the displacement transducer 9, the movement-distance derivation section 16 calculates the distance by which the sample board 7 has moved before the objective lens 5's focal position meets an object to be measured inside of the sample. Thereby, it derives the depth at which the measured object lies in the sample. This will be specifically explained below. The multi-layer optical disk 6 as the sample is provided with the plurality of record layers 61, 62, 63. The layers between these record layers are transparent layers. Hence, a laser beam which is collected by the objective lens 5 is reflected by the record layers 61, 62, 63. When this collected laser beam's focal point coincides exactly with the record layers 61, 62, 63, it passes through the pinhole 11. Then, a peak appears in the received-light quantity of the reflected beam which is received by the photo-detector 12. At this time, if the position of the sample board 7 is read, the position of the sample board 7 can be detected at the time when the laser beam's focal point coincides with the record layers 61, 62, 63. By obtaining the difference between this position and the above described reference position, the movement distance of the sample board 7 can be derived until the focal point meets the record layer from the reference position. This makes it possible to derive the inside-sample depth of the record layers 61, 62, 63. In the case where the multi-layer optical disk 6 is used as the sample, the record layers 61, 62, 63 correspond to the measured object.

On the basis of the inside-sample depth and the sample's refractive index, the correction control section 17 controls the movement of the concave lens 4a. A specific description will be given below. The objective lens 5 is designed so that the spherical aberration of a laser beam which is collected by the objective lens 5 comes to the minimum in the air. Thereby, when this laser beam which is collected by the objective lens 5 is transmitted by the transparent layer of the multi-layer optical disk 6, a spherical aberration is caused. The amount of this spherical aberration corresponds to the thickness (i.e., inside-sample depth of the measured object) of the transparent layer through which the laser beam passes, and the refractive index of the transparent layer. Therefore, a spherical aberration is corrected based on the inside-sample depth derived by the movement-distance derivation section 16 and the refractive index of the transparent layer such as a cover-glass layer of the multi-layer optical disk 6.

Herein, in order to correct the spherical aberration of a laser beam which goes into the multi-layer optical disk 6, after the reference position of the sample board 7 is detected, the concave lens 4a is moved in the optical-axis directions of the objective lens 5. The movement distance of the concave lens 4a has a predetermined ratio to the movement distance of the sample board 7. This predetermined ratio is set based upon the refractive index of the transparent layer of the multi-layer optical disk 6. The refractive index of each layer which makes up the sample is already known, and thus, such a refractive index can be used. For example, the refractive index of a cover-glass layer which is made of a polycarbonate is 1.579 for a wavelength of 652 nm.

The film-thickness derivation section 19 is connected to the aberration correction controller 13. The film-thickness derivation section 19 obtains a difference in the inside-sample depth of each record layer 61, 62, 63 which is derived by the movement-distance derivation section 16. Thereby, it derives the thickness (i.e., film thickness) of the cover-glass layer and the thickness (i.e., film thickness) of the transparent layer between the record layers.

Next, the operation of the film-thickness measurement apparatus 25 according to this embodiment will be described with reference to FIG. 1, FIG. 2A and FIG. 2B. FIG. 2A shows a state in which the focal position of the objective lens 5 is coincident with the surface of the multi-layer optical disk 6. FIG. 2B shows a state in which the focal position of the objective lens 5 is inside of the multi-layer optical disk 6. In an initial state where a measurement starts, in the same way as shown in FIG. 2A, a beam of light which is incident on the objective lens 5 is set as a parallel beam.

As shown in FIG. 1, a laser beam which is emitted from the laser light source 1 is transformed, by the collimating lens 2, from a divergent beam to a parallel beam. Then, its direction is changed, by the light-branching element 3, so that it goes to the concave lens 4a of the spherical-aberration correction element 4. The laser beam which has turned into a divergent beam by the concave lens 4a is again transformed into a parallel beam by the convex lens 4b. Then, it is incident upon the objective lens 5. This laser beam is concentrated by the objective lens 5 and is reflected by the surface of the multi-layer optical disk 6 or the record layers 61, 62, 63. This reflected beam passes through the objective lens 5 and the spherical-aberration correction element 4. Thereafter, it is transmitted by the light-branching element 3 and is concentrated by the detection lens 10. Then, it is incident upon the pinhole 11. At this time, because of a function of a confocal optical system, only the reflected beam which is reflected from the focal point of the objective lens 5 and its vicinity passes through the pinhole 11. The laser beam which has passed through the pinhole 11 is received by the photo-detector 12. The photo-detector 12 conducts a photoelectric conversion according to the beam of light which it has received. Then, it outputs an electric signal to the aberration correction controller 13, according to the quantity (or intensity) of the beam of light it has received.

In the initial state where the measurement starts, the concave lens 4a of the spherical-aberration correction element 4 is set in a position where an incident beam of light on the objective lens 5 becomes a parallel beam. In this initial state, based on a measurement value by the displacement transducer 9, the position of the sample board 7 is set so that the multi-layer optical disk 6 is located farther away from the objective lens 5 than the objective lens 5's focal point is. Therefore, the reflected beam which has been reflected by the surface of the multi-layer optical disk 6 is supposed not to pass through the pinhole 11.

When the measurement begins, the drive mechanism 8 lifts the sample board 7, so that the multi-layer optical disk 6 moves in the direction closer to the objective lens 5. As shown in FIG. 2A, until the surface of the multi-layer optical disk 6 coincides with the focal point of the objective lens 5, the incident beam upon the objective lens 5 is kept as a parallel beam. Hence, a concentrated-light spot with the shortest spherical aberration can be obtained. Then, as shown in FIG. 2A, when the surface of the multi-layer optical disk 6 coincides with the focal point of the objective lens 5, a reflected beam which is reflected by the surface of the multi-layer optical disk 6 passes through the pinhole 11. Thereby, a signal is obtained for the first time by the photo-detector 12. Hence, from this detection result, the fact that the focal point has met the surface of the multi-layer optical disk 6 can be detected. Based on an output from the displacement transducer 9, the aberration correction controller 13 stores the position (i.e., reference position) of the sample board 7 at this time.

After the reference position is stored, the sample board 7 is moved, and the concave lens 4a is moved as well. In other words, the sample board 7 comes closer to the objective lens 5, the focal point of a laser beam which is concentrated by the objective lens 5 goes into the multi-layer optical disk 6. At this time, the distance by which the sample board 7 has moved is measured by the displacement transducer 9. This gives the depth up to which the focal point has entered the multi-layer optical disk 6. This physical length is multiplied by the refractive index of the multi-layer optical disk 6, so that an optical length is obtained. According to this optical length, a spherical aberration is corrected. This spherical-aberration correction is made, as shown in FIG. 2B, by moving the concave lens 4a closer to the convex lens 4b so that the incident beam upon the objective lens 5 turns into a divergent beam. This makes it possible to reduce the focal point's spherical aberration. In other words, in this embodiment, a spherical aberration is designed to come to the minimum when the objective lens 5 forms a focal point in the air. Hence, in a state where the focal point is inside of the multi-layer optical disk 6, if the incident beam upon the objective lens 5 remains as a parallel beam, a plus spherical aberration is generated (i.e., an under-correction). Therefore, as shown in FIG. 2B, a divergent beam is produced by the spherical-aberration correction element 4, so that the spherical aberration is subjected to an over-correction. In total, the spherical aberration can be brought to its minimum.

When the sample board 7 moves up, the focal point goes into the multi-layer optical disk 6. At this time, a reflected beam which is reflected by a first record layer 61 is incident on the pinhole 11. However, it does not pass through the pinhole 11 until the focal point coincides with the first record layer 61. Then, if the focal point coincides with the first record layer 61, the reflected beam can be detected in the photo-detector 12. At this time, the position of the sample board 7 is detected by the displacement transducer 9. Based on the difference between this position and the reference position, the distance by which the sample board 7 moves is derived. This movement distance corresponds to the depth from the surface of the multi-layer optical disk 6 up to the first record layer 61. Hence, the thickness of the cover glass layer is derived from this movement distance. Similarly, the position of the sample board 7 is detected when the focal point coincides with a second record layer 62. This also makes it possible to measure the thickness of the transparent layer between the first record layer 61 and the second record layer 62.

FIG. 3 is a flow chart, showing the algorithm of the above described operation. The film-thickness measurement operation will again be described with reference to this flow chart. When the measurement operation starts (in a step ST1), first, the sample board 7 is moved down. Thereby, the distance between the objective lens 5 and the multi-layer optical disk 6 becomes longer (in a step ST2). At this time, the position of the sample board 7 is detected, using a measurement value of the displacement transducer 9. On the basis of this detection result, a decision is made whether or not the focal position of the objective lens 5 is outside of the multi-layer optical disk 6 (in a step ST3). If the decision is made that the focal position is located above the upper surface of the multi-layer optical disk 6, then this time, the sample board 7 is moved up. Thereby, the distance between the multi-layer optical disk 6 and the objective lens 5 becomes shorter (in a step ST4).

A signal from the photo-detector 12 is inputted in the aberration correction controller 13. Thus, after the sample board 7 is moved and the multi-layer optical disk 6 begins to come closer to the objective lens 5, a first signal peak is detected. Thereby, a decision is made whether the focal point of the objective lens 5 has coincided with the surface of the multi-layer optical disk 6 (in a step ST5). If the signal peak is detected, an operation is made for shortening the distance between the objective lens 5 and the multi-layer optical disk 6. Simultaneously, the concave lens 4a is driven to make a spherical aberration correction (in a step ST6). Thereafter, if the signal peak is obtained in the photo-detector 12 (in a step ST7), a measurement value at this time by the displacement transducer 9 is stored (in a step ST8). Then, a film thickness is calculated using each peak interval. If the distance between the objective lens 5 and the multi-layer optical disk 6 becomes equal to, or shorter than, a preset value K at which a necessary measurement can be conducted (in a step ST9), then the measurement is terminated (in a step ST10). This K can be set to, for example, a limit value at which the objective lens 5 is prevented from hitting against the multi-layer optical disk 6.

As described so far, in this first embodiment, a spherical aberration is corrected according to the inside-sample depth of an object to be measured. Therefore, a correction can be made even in a spherical aberration which is generated when a beam of light goes into a sample. Besides, in this first embodiment, a spherical aberration is corrected, taking the refractive index of a sample into account. This helps make such a correction more precisely. Therefore, a spherical aberration can be restrained from being produced, thus conducting a film-thickness measurement with high precision.

Herein, in this first embodiment, the multi-layer optical disk 6 is moved by moving the sample board 7 up and down, so that the distance between the objective lens 5 and the sample board 7 is changed. However, instead of this, the objective lens 5 and the spherical-aberration correction element 4 may also be united and driven.

In addition, in this first embodiment, the numerical aperture of the objective lens 5 is set at 0.8. However, it is not limited to 0.8. Furthermore, a confocal optical system's resolving power in its optical-axis directions is inversely proportional to approximately the square of the objective lens 5's numerical aperture. Hence, if the numerical aperture is 0.5, the resolving power in the optical-axis directions is about 1.8 µm. Thereby, a multi-layer disk can be sufficiently measured, as long as it has a layer interval of, for example, some 10 µm.

Moreover, in this first embodiment, a spherical aberration is corrected based on the inside-sample depth of the record layers 61, 62, 63 and the refractive index of the transparent layers. However, instead of this, a spherical-aberration correction may also be made according to only the inside-sample depth of the record layers 61, 62, 63. For example, the refractive index of the cover glass layer is already known. Hence, from the result of a simulation, an experiment or the like, the correlation between the inside-sample depth and the spherical aberration which is generated at that time can be obtained in advance. If the aberration to be corrected which corresponds to the inside-sample depth is determined using this correlation, the spherical aberration can be corrected according to only the inside-sample depth.

Herein, the characteristics of this first embodiment will be described.

(1) The above described correction control section controls the above described spherical-aberration correction section according to the inside-sample depth of the measured object and the refractive index of the sample. Therefore, a spherical aberration is corrected, taking the sample's refractive index into account. This helps enhance the precision of such a correction further. Besides, in the case where the kind of a sample is determined and its refractive index is fixed, even if a spherical aberration is corrected according to the inside-sample depth of the measured object, the spherical-aberration correction can be made. On the other hand, in the case where the kind of a sample is not fixed, the refractive index which corresponds to the sample to be measured is considered. This makes it possible to correct the spherical aberration more accurately according to the sample's type.

(2) The above described spherical-aberration correction section includes a concave lens and a convex lens. The above described correction control section controls the movement of the concave lens or the convex lens, on the basis of the inside-sample depth and the refractive index of the sample. Therefore, a spherical aberration is corrected by controlling the movement of the concave lens, and thus, using such a simple configuration, the correction can be certainly made.

(3) The diameter of the pinhole is set at or below the triple of the Airy-disk diameter which is determined by the wavelength of a beam of light that is emitted from the light source and the numerical aperture of the detection lens. This helps secure a required resolving power in the optical-axis directions, as well as adjust the position of the detection lens or the pinhole more easily.

(4) The diameter of the pinhole is set to be equal to, or narrower than, the Airy-disk diameter. Therefore, the resolving power can be made greater.

(5) The numerical aperture of the objective lens is set at 0.8 or more. This helps secure a necessary quantity of light and obtain a required resolving power.

(6) The film-thickness measurement apparatus includes a confocal optical device, and a film-thickness derivation section which derives a film thickness from a difference in the movement distance of the sample board. Therefore, a spherical aberration can be corrected with high precision, and at the same time, the film thickness of an object to be measured inside of the sample can be measured.

(7) The above described confocal optical device, and the above described film-thickness derivation section which derives a film thickness from a difference in the movement distance of the sample board, are provided. Therefore, a spherical aberration can be corrected with high precision, and at the same time, the film thickness of an object to be measured inside of the sample can be measured.

(8) A multi-layer optical disk is used as the sample.

(9) A spherical-aberration correction method is provided in which a spherical aberration is corrected on the basis of the inside-sample depth of the measured object and the refractive index of the sample. Therefore, a spherical aberration is corrected, taking the sample's refractive index into account. This helps enhance the precision of such a correction further. Besides, in the case where the kind of a sample is determined and its refractive index is fixed, even if a spherical aberration is corrected according to the inside-sample depth of the measured object, the spherical-aberration correction can be made. On the other hand, in the case where the kind of a sample is not fixed, the refractive index which corresponds to the sample to be measured is considered. This makes it possible to correct the spherical aberration more accurately according to the sample's type.

(10) A spherical-aberration correction method is provided in which a spherical aberration is corrected by transforming a beam of light incident upon the objective lens into a divergent beam. Therefore, the spherical aberration can be easily corrected.

(11) A film-thickness measurement method is provided in which a spherical aberration is corrected by the above described spherical-aberration correction method, and a film thickness is measured based on the inside-sample depth of the measured object.

Second Embodiment

Figure 4C:
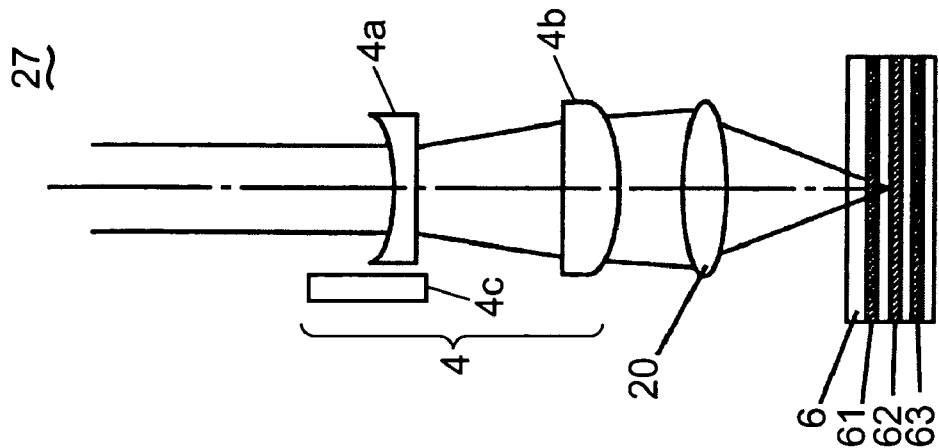
FIG. 4C is a schematic view of the film-thickness measurement apparatus, showing a spherical-aberration correction in a state where the focal point of the objective lens is coincident with a second record layer of the multi-layer optical disk.
Figure 4B:
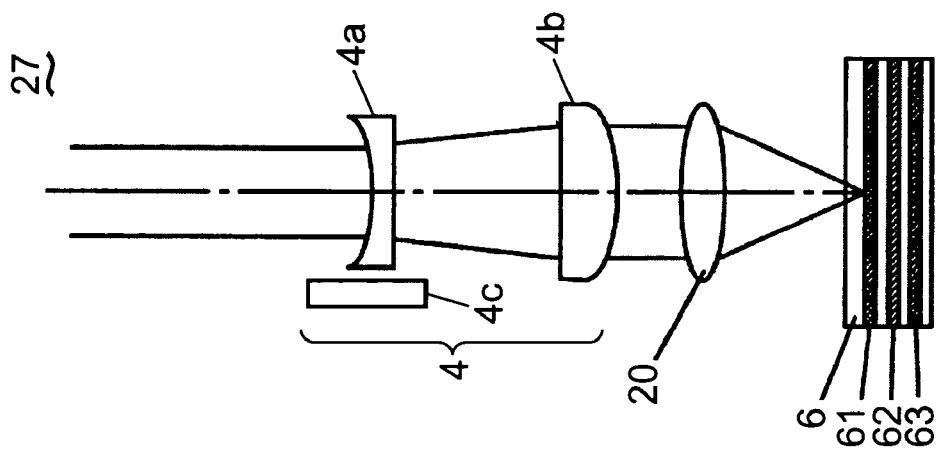
FIG. 4B is a schematic view of the film-thickness measurement apparatus, showing a spherical-aberration correction in a state where the focal point of the objective lens is coincident with a first record layer of the multi-layer optical disk.
Figure 4A:
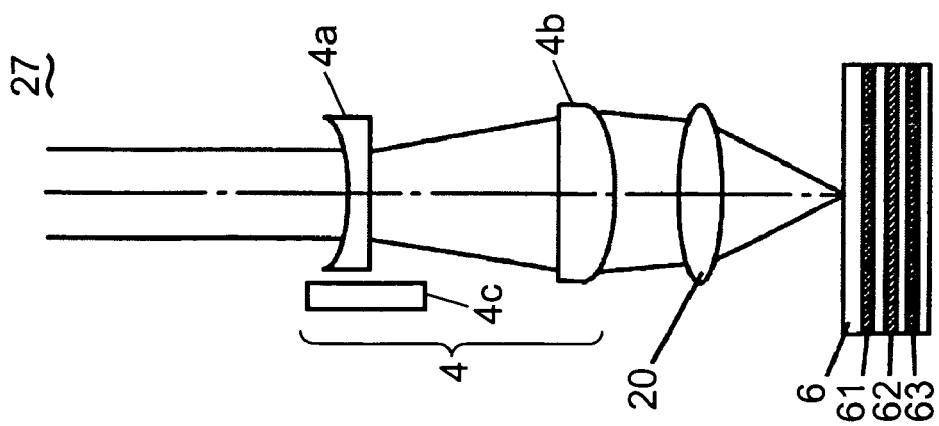
FIG. 4A is a schematic view of a film-thickness measurement apparatus according to a second embodiment of the present invention, showing a spherical-aberration correction in a state where the focal point of an objective lens is coincident with the surface of a multi-layer optical disk.

A second embodiment of the present invention has some different points in a spherical-aberration correction from the first embodiment. These points will be described with reference to FIG. 4A to FIG. 4C. FIGS. 4A to 4C are each a schematic view of the confocal optical device 27 according to the second embodiment of the present invention, showing aspherical-aberration correction. In FIGS. 4A to 4C, component elements are given the same reference characters and numerals as those of FIG. 1, as long as the former are identical to the latter. Thus, their description is omitted.

In this embodiment, an objective lens 20 is designed so that a spherical aberration comes to the minimum at a predetermined cover-glass thickness (e.g., 0.17 mm). FIG. 4A shows a state where the focal point of an objective lens 20 is coincident with the surface of the multi-layer optical disk 6. FIG. 4B shows a state where the focal point of the objective lens 20 is located at 0.17 mm on the inside from the surface of the multi-layer optical disk 6. FIG. 4C shows a state where the focal point of the objective lens 20 lies beyond a depth of 0.17 mm on the inside from the surface of the multi-layer optical disk 6.

In this second embodiment, when a parallel beam is incident on the objective lens 20, a spherical aberration is under-corrected in the air. Hence, as shown in FIG. 4A, the distance between the lenses of the spherical-aberration correction element 4 is lengthened (i.e., the concave lens 4a is brought farther away from the convex lens 4b). Thereby, a convergent beam is incident upon the objective lens 20. By doing this, a spherical aberration comes to the minimum, even if the focal point of the objective lens 20 does not reach the surface of the multi-layer optical disk 6, or even if it coincides with the surface of the multi-layer optical disk 6. Besides, when a measurement starts, as shown in FIG. 4A, the distance between the concave lens 4a and the convex lens 4b is set beforehand. Therefore, when the focal point of the objective lens 20 coincides with the surface of the multi-layer optical disk 6, there is no need to correct a spherical aberration afresh. This helps shorten a measurement time.

Then, as shown in FIG. 4B, if the focal point of the objective lens 20 comes into the multi-layer optical disk 6, by 0.17 mm from its surface, then an emitted beam from the spherical-aberration correction element 4 is designed to be a parallel beam. In this state, the objective lens 20 is designed so that a spherical aberration comes to the minimum. Thus, when the focal point of the objective lens 20 coincides with the first record layer 61, the spherical aberration becomes the minimum.

In addition, in the case of this objective lens 20, when its focal point comes deep inside, or beyond 0.17 mm, from the surface of the multi-layer optical disk 6, the objective lens 20's spherical aberration is over-corrected. Hence, as shown in FIG. 4C, by shortening the distance between the concave lens 4a and the convex lens 4b, a divergent beam is incident on the objective lens 20. By doing this, a spherical aberration comes to the minimum, even if the focal point comes beyond 0.17 mm inside from the surface.

As described above, in this embodiment, the objective lens 20 is used which is designed so as to correspond to the 0.17 mm cover glass layer. Therefore, when the layer distance is measured between the record layers 61, 62, 63 of the multi-layer optical disk 6 which has a cover glass layer whose thickness is substantially 0.17 mm, a spherical aberration including even a higher-order aberration can be brought to the shortest level.

Incidentally, the other configurations, operation and advantages are the same as those of the first embodiment.

Herein, the characteristics of this second embodiment will be described.

(1) The above-described objective lens is designed so that a spherical aberration comes to the minimum at a predetermined depth inside of a sample. Even if the objective lens is designed like this, a spherical aberration can be corrected beforehand so as to come to the minimum in the air by a spherical aberration correcting mechanism or the like. Therefore, when the focal point of the objective lens coincides with the surface of the sample, there is no need to correct the spherical aberration over anew. This helps shorten time for a measurement.

Third Embodiment

In the above-described first and second embodiments, by changing the distance between the concave lens 4a and the convex lens 4b, a spherical aberration is corrected. However, in this third embodiment, in addition to the fact that the lens interval is changed, the distance between the objective lens 5 and a sample (i.e., the multi-layer optical disk 6) is also changed.

Figure 5:
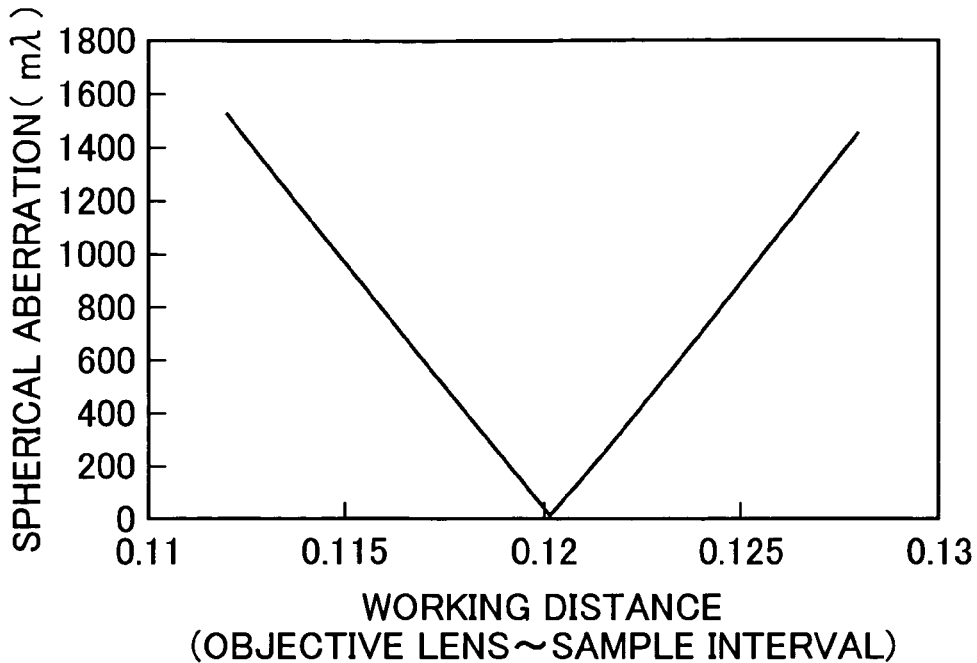
FIG. 5 is a graphical representation, showing the correlation between a working distance and a spherical aberration in the case where a concave lens is apart from a convex lens by a predetermined distance.

Specifically, in this third embodiment, after a measurement began, the fact that the surface of the multi-layer optical disk 6 has coincided with the focal point of the objective lens 5, is detected. At this time, control is executed so that the lens distance between the concave lens 4a and the convex lens 4b is changed, and that the sample board 7 is lifted at a predetermined velocity. The velocity at which the sample board 7 is moved up can be obtained from a simulation result. For example, FIG. 5 is a graphical representation which is obtained by simulating a spherical aberration that is generated when the distance between the objective lens 5 and the sample board 7 is changed in the case where the concave lens 4a is apart from the convex lens 4b by a predetermined distance. If the sample board 7 is lifted so that the distance between the objective lens 5 and the sample board 7 becomes gradually shorter, with keeping the distance between the concave lens 4a and the convex lens 4b at a fixed value, then a minimal value emerges where the spherical aberration is at the shortest level. Then, the distance between the concave lens 4a and the convex lens 4b is varied, and in the same way, the spherical aberration is simulated. Thereby, the minimal value of the spherical aberration is obtained. Therefore, according to the lens distance between the concave lens 4a and the convex lens 4b, the distance between the objective lens 5 and the sample board 7 at which the spherical aberration comes to the minimum can be obtained.

Then, in order to correct the spherical aberration, the distance between the concave lens 4a and the convex lens 4b is changed. Simultaneously, the distance between the objective lens 5 and the sample board 7 is finely adjusted to the distance at which the spherical aberration comes to the minimum which is obtained from the simulation result. This helps make the spherical aberration smaller.

Figure 6:
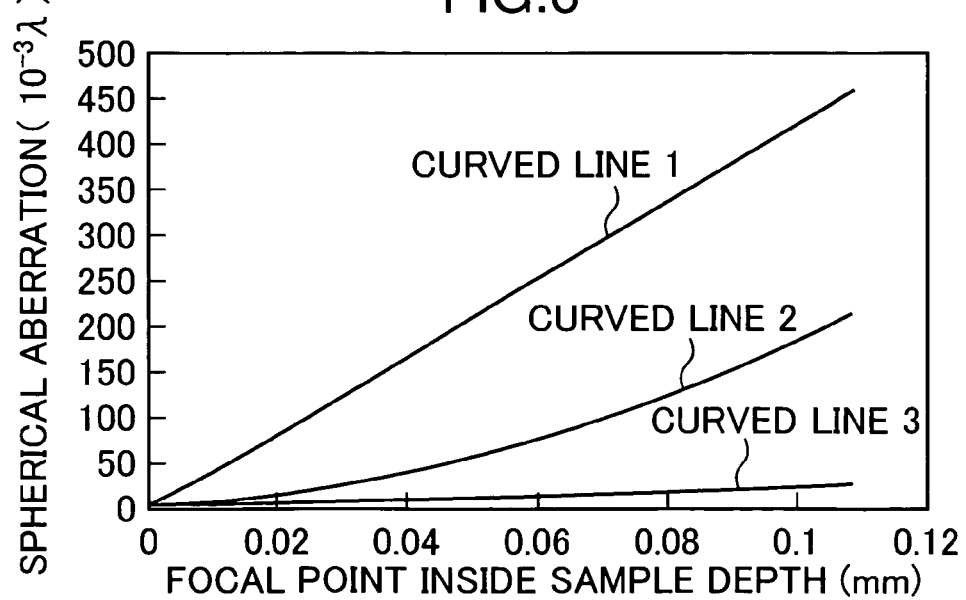
FIG. 6 is a graphical representation, showing the correlation between the depth at which a focal point is located in a sample and a spherical aberration, in a film-thickness measurement apparatus according to a third embodiment of the present invention, the film-thickness measurement apparatus according to the first embodiment of the present invention and a film-thickness measurement apparatus which is supposed to conduct no spherical aberration.

Herein, FIG. 6 is a graphical representation, showing a result which is obtained by comparing the following three cases: a spherical aberration is not corrected according to the depth of a sample; the spherical aberration is corrected by changing the distance between the concave lens 4a and the convex lens 4b; and the spherical aberration is corrected by changing the distance between the objective lens 5 and the sample in addition. In FIG. 6, the horizontal axis indicates the depth at which the focal point of the objective lens 5 is located inside of the sample. The vertical axis indicates the spherical aberration.

In this figure, a curved line 1 shows the case where the spherical aberration is not corrected according to the depth of the sample. A curved line 2 shows the case where the spherical aberration is corrected by changing the distance between the concave lens 4a and the convex lens 4b, as is the case with the first embodiment. A curved line 3 shows, as described in this third embodiment, the case where the spherical aberration is corrected not only by changing the distance between the concave lens 4a and the convex lens 4b, but also by changing the distance between the objective lens 5 and the sample board 7. Unless the spherical aberration is corrected according to the depth at which the focal point is inside of the sample (i.e., the curved line 1), the deeper the focal point of the objective lens 5 goes inside of the sample, the greater the spherical aberration becomes rapidly. In contrast, if the spherical aberration is corrected by changing the distance between the concave lens 4a and the convex lens 4b (i.e., the curved line 2), the spherical aberration can be reduced. In addition, if the spherical aberration is corrected by changing the distance between the objective lens 5 and the sample (i.e., the curved line 3), the spherical aberration can be further reduced.

Incidentally, the other configurations, operation and advantages are the same as those of the first embodiment.

Herein, the characteristics of this third embodiment will be described.

(1) The above described correction control section controls the above described spherical-aberration correction section, as well as controls the movement distance of the above described objective lens or sample board. Therefore, a spherical aberration correction can be made, not only by using the spherical-aberration correction section, but also by adjusting the distance between the objective lens and the sample board. Therefore, the aberration correction can be made more finely and accurately.

(2) The correction control section controls the movement of the above described concave lens or convex lens, as well as controls the movement distance of the objective lens or sample board. According to the distance between the concave lens and the convex lens, the distance between the objective lens and the sample board is designed to be adjusted to the distance at which the spherical aberration comes to the minimum. Therefore, a fine and accurate adjustment can be made for the aberration correction, using such a simple configuration.

(3) A spherical-aberration correction method is provided in which a spherical aberration is corrected by transforming a beam of light incident upon the objective lens into a divergent beam, and changing the distance between the objective lens and the sample board. Therefore, a spherical aberration correction can be made, not only by using an incident beam on the objective lens, but also by adjusting the distance between the objective lens and the sample board. Therefore, the aberration correction can be made more finely and accurately.

Fourth Embodiment

Figure 7:
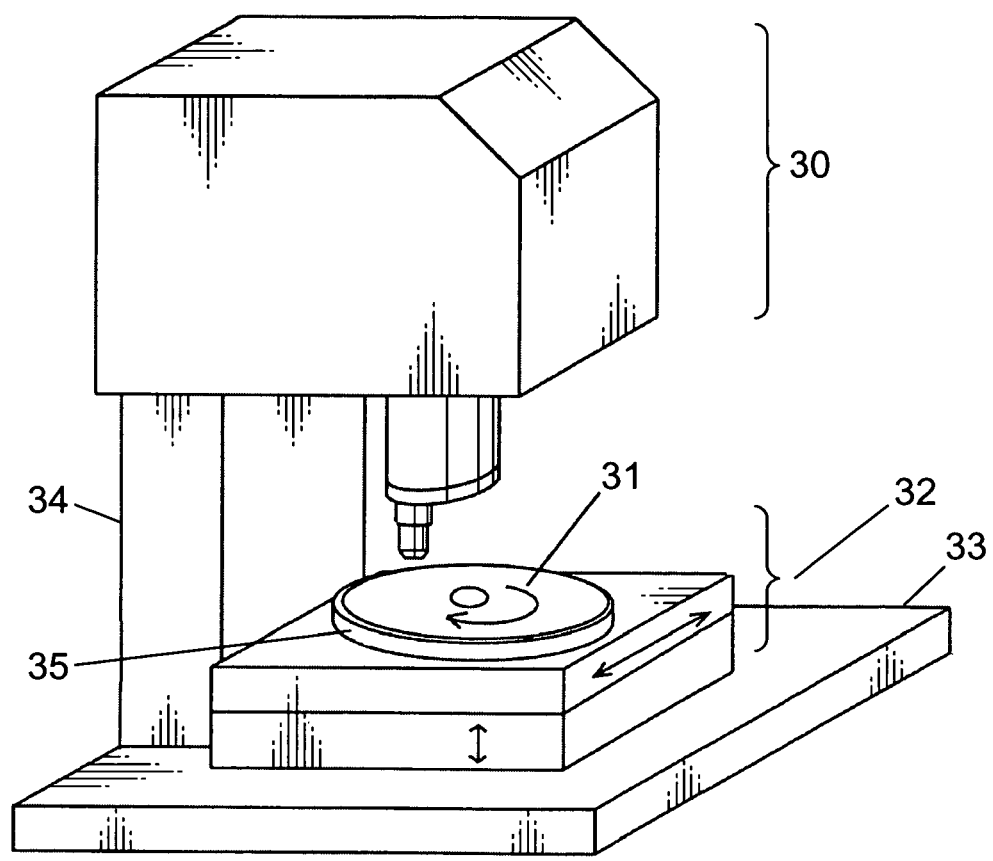
FIG. 7 is a perspective view of a film-thickness measurement apparatus according to a fourth embodiment of the present invention, showing its exterior appearance.

FIG. 7 is a perspective view of a film-thickness measurement apparatus 25 according to a fourth embodiment of the present invention, showing its exterior appearance. As shown in FIG. 7, the film-thickness measurement apparatus 25 includes: a base 33; a stand 34 which extends upward from this base 33; a sample board 32 which can be slid up and down along this stand 34; and a measurement section 30 which is supported on the stand 34. In the measurement section 30, the optical system is disposed which ranges from the laser light source 1 to the photo-detector 12. This optical system is an optical system for the above described confocal optical device 27 according to the first embodiment. Herein, this may also be replaced with an optical system for the above described confocal optical device according to the second or third embodiment.

A sample 31 is placed on the sample board 32. In this embodiment, the sample 31 is a multi-layer optical disk. The sample board 32 has an X-Z-θ stage. It is designed so as to move along the stand 34 in the optical-axis directions (i.e., the Z directions) of the objective lens 5. It is also designed so as to move along the base 33 in the one-axis directions (i.e., the X directions) on the plane perpendicular to the optical axis. Besides, the sample board 32 is provided with a turntable 35 which turns around the center of the multi-layer optical disk 31.

When the multi-layer optical disk 31 is set on the sample board 32, the sample board 32 moves in the Z-axis directions until the surface of the multi-layer optical disk 31 is brought out of the focal point of the objective lens 5 disposed in the measurement section 30. When the multi-layer optical disk 31 comes below the focal point of the objective lens 5, this time, the sample board 32 moves in the opposite directions. In this state, the film thickness of the multi-layer optical disk 31 is measured. Then, if the sample board 32 is moved in the X-axis directions, the film-thickness distribution in the radius directions of the multi-layer optical disk 31 can be measured. Besides, by turning the turntable 35 of the sample board 32, the film-thickness distribution in the circumferential directions of the multi-layer optical disk 31 can be measured.

Incidentally, in this embodiment, the film-thickness distribution measurement of three dimensions has been described by exemplifying the multi-layer optical disk 31. However, the present invention's application is not limited only to the film-thickness measurement of a multi-layer optical disk.

Herein, the characteristics of this fourth embodiment will be described.

(1) The above described sample board can be moved in the optical-axis directions of the objective lens. It can also be moved on the plane perpendicular to this optical axis. In addition, it is provided with the turntable which turns around the center of the multi-layer optical disk. This makes it possible to measure the film-thickness distributions in the radius directions and in the circumferential directions of the multi-layer optical disk.

Fifth Embodiment

Figure 8:
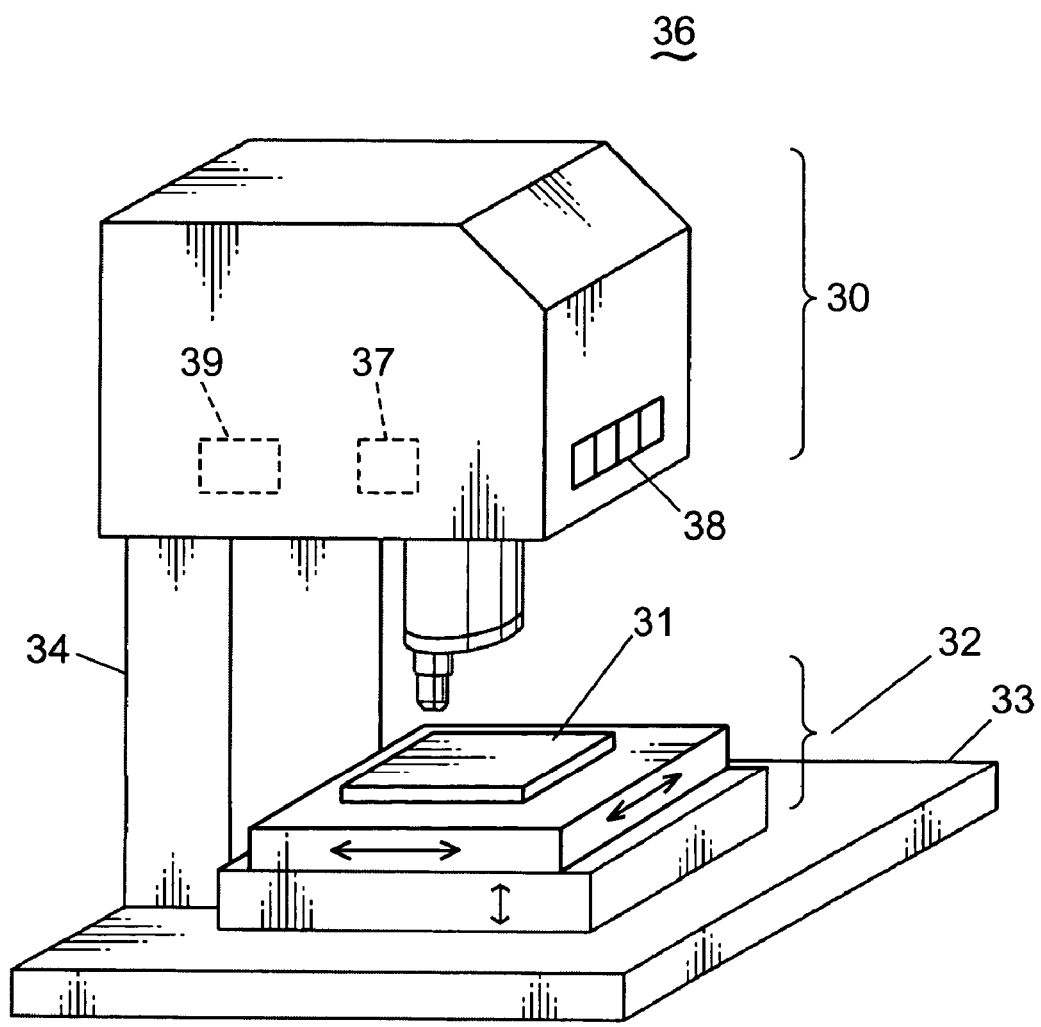
FIG. 8 is a perspective view of a shape measurement apparatus according to a fifth embodiment of the present invention, showing its exterior appearance.

FIG. 8 is a perspective view of a shape measurement apparatus 36 according to a fifth embodiment of the present invention, showing its exterior appearance. As shown in FIG. 8, the shape measurement apparatus 36 includes: a base 33; a stand 34 which extends upward from this base 33; a sample board 32 which can be slid up and down along this stand 34; and a measurement section 30 which is supported on the stand 34. In the measurement section 30, the optical system is disposed which ranges from the laser light source 1 to the photodetector 12. This optical system is an optical system for the above described confocal optical device 27 according to the first embodiment. Herein, this may also be replaced with an optical system for the above described confocal optical device according to the second or third embodiment.

The sample board 32 has an X-y-Z stage. It is designed so as to move along the stand 34 in the optical-axis directions (i.e., the Z directions) of the objective lens 5. It is also designed so as to move along the base 33 in the directions (i.e., the X directions and the Y directions) of two axes which cross at right angles on the plane perpendicular to the optical axis of the objective lens 5.

The confocal optical device 27 includes a storage section 37 and a selection section 38. In the storage section 37, data is stored on the refractive index of a transparent layer which is provided in various samples. The selection section 38 is used to select a sample to be measured. It has a plurality of switches which correspond to each measured sample. If a switch is pushed, the refractive index of a transparent layer in the sample which corresponds to this switch is supposed to be chosen. On the basis of the chosen refractive index and the inside-sample depth, the correction control section 17 of the aberration correction controller 13 is designed to control the movement of the concave lens 4a.

A sample is placed on the sample board 32. As such a sample, for example, an LSI can be chosen. The surface of an LSI is formed by an oxide film as a protective layer. The refractive index of this oxide film is, for example, 1.542, if the wavelength of a laser beam is 652 nm. If an LSI is chosen as the sample, 1.542 is adopted as the refractive index. Then, a spherical aberration is corrected.

The shape measurement apparatus 36 is provided with a shape derivation section 39 which derives the shape of the sample from a movement distance in the above mentioned two-axis directions and a movement distance in the optical-axis directions. The sample board 32 is moved in the X directions, the Y directions and the Z directions, so that the coordinate value of a measurement point on the sample board 32 is secured. In addition, the strength of a signal by a photo-detector is measured. Thereby, the three-dimensional shape of an object to be measured inside of the sample can be measured.

Furthermore, in this fifth embodiment, the storage section 37 and the selection section 38 are provided, so that a spherical aberration can be corrected for various samples.

Incidentally, a shape measurement can be conducted for a plurality of samples, but the present invention is not limited to this. In short, unless a selection section is provided, only the shape of a specific sample can be measured. In that case, a shape measurement apparatus can be simply configured. The other configurations, operation and advantages are the same as those of the first embodiment.

Herein, the characteristics of this fifth embodiment will be described.

(1) There are provided a storage section in which data is stored on the refractive index of a transparent layer that is provided in various samples, and a selection section which selects a sample to be measured. Therefore, a spherical aberration can be corrected for various samples.

(2) A shape measurement apparatus is provided which includes a confocal optical device, and in which the sample board can move in the directions of two perpendicular axes on the perpendicular plane to the directions of the optical axis of the objective lens, and a shape derivation section derives the shape of the sample from a movement distance in the two-axis directions and a movement distance in the optical-axis directions. Therefore, the three-dimensional shape of an object to be measured inside of the sample can be measured.

(3) A shape measurement method is provided in which the sample board is moved in the directions of the optical axis of the objective lens and is also moved in the directions perpendicular to this, a spherical aberration is corrected by the spherical-aberration correction method, and the shape of the measured object is measured by measuring the inside-sample depth of the measured object in the width directions.

This application is based on Japanese patent applications serial No. 2004-323350 filed on Nov. 8, 2004 and serial No. 2005-28175.7 filed on Sep. 28, 2005, in Japan Patent Office, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A confocal optical device in which an objective lens concentrates a beam of light emitted from a light source upon the inside of a sample on a sample board, a detection lens concentrates a beam of light reflected from the sample so that the beam of light passes through a pinhole, and a photo-detector detects the beam of light, comprising:

a drive mechanism which moves either of the objective lens and the sample board so that the distance is changed between the objective lens and the sample board;

a spherical-aberration correction section which is disposed between the light source and the objective lens;

a reference-position detection section which, based on a detection result by the photo-detector, detects the position of the objective lens or the sample board when the focal position of the objective lens coincides with the surface of the sample;

a movement-distance derivation section which, based on a detection result by the photo-detector, calculates a distance by which the objective lens or the sample board is moved until the focal position of the objective lens coincides with an object to be measured inside of the sample, and derives the depth at which the measured object is located in the sample; and a correction control section which controls the spherical-aberration correction section according to the inside-sample depth of the measured object based on a predetermined ratio, which is based on a correlation between a movement distance of the objective lens or the sample board and the spherical aberration obtained in advance, to the movement distance of the objective lens or the sample board.

2. The confocal optical device according to claim 1, wherein the correction control section controls the spherical-aberration correction section based on the inside-sample depth of the measured object and the refractive index of the sample.

3. The confocal optical device according to claim 1, wherein the correction control section controls the spherical-aberration correction section and controls the movement distance of the objective lens or the sample board.

4. The confocal optical device according to claim 1, wherein:
the spherical-aberration correction section includes a concave lens and a convex lens; and
the correction control section controls the movement of the concave lens or the convex lens, based on the inside-sample depth, the refractive index of the sample and a predetermined ratio to a movement distance of the objective lens or the sample board.

5. The confocal optical device according to claim 4, wherein the correction control section: controls the movement of the concave lens or the convex lens; controls the movement distance of the objective lens or the sample board; and according to the distance between the concave lens and the convex lens, adjusts the distance between the objective lens and the sample board to the distance at which a spherical aberration comes to the minimum.

6. The confocal optical device according to claim 1, wherein the diameter of the pinhole is set at or below the triple of an Airy-disk diameter which is determined according to the wavelength of a beam of light emitted from the light source and the numerical aperture of the detection lens.

7. The confocal optical device according to claim 6, wherein the diameter of the pinhole is set at or below the Airy-disk diameter.

8. The confocal optical device according to claim 1, wherein the numerical aperture of the objective lens is set at 0.8 or above.

9. The confocal optical device according to claim 1, wherein the objective lens is set so that a spherical aberration comes to the minimum at a predetermined depth inside of the sample.

10. The confocal optical device according to claim 1, further comprising:
a storage section in which data is stored of the refractive index of a transparent layer that is provided in various samples; and
a selection section which selects a sample to be measured.

11. A film-thickness measurement apparatus, comprising:
the confocal optical device according to claim 1; and
a film-thickness derivation section which derives a film thickness from a difference in the movement distance of the sample board.

12. The film-thickness measurement apparatus according to claim 11, wherein a multi-layer optical disk is used as the sample.

13. The film-thickness measurement apparatus according to claim 12, wherein the sample board moves in the directions of the optical axis of the objective lens, moves on a plane perpendicular to the optical axis, and includes a turntable which turns around the center of the multi-layer optical disk.

14. A shape measurement apparatus, comprising the confocal optical device according to claim 1, wherein:
the sample board moves in the directions of two perpendicular axes on a plane perpendicular to the directions of the optical axis of the objective lens; and
a shape derivation section is provided which derives the shape of the sample from a movement distance in the two-axis directions and a movement distance in the optical-axis direction.

15. A spherical-aberration correction method in which a spherical aberration is corrected which is generated when an objective lens concentrates a beam of light emitted from a light source upon the inside of a sample on a sample board, comprising:
a detection lens concentrating a beam of light reflected from the sample so that the beam of light passes through a pinhole, and a photo-detector detecting the beam of light;
moving either of the objective lens and the sample board so that the distance is changed between the objective lens and the sample board, and based on a detection result by the photo-detector, detecting the position of the objective lens or the sample board when the focal position of the objective lens coincides with the surface of the sample;
further moving the objective lens or the sample board, and based on a detection result by the photo-detector, detecting the position of the objective lens or the sample board when the focal position of the objective lens coincides with an object to be measured inside of the sample;
deriving the depth at which the measured object is located in the sample from the position when the focal position coincides with the surface of the sample and the position when the focal position coincides with the measured object; and
correcting the spherical aberration according to the inside-sample depth of the measured object based on a predetermined ratio to a movement distance of the objective lens or the sample board.

16. spherical-aberration correction method according to claim 15, wherein the spherical aberration is corrected based on the inside-sample depth of the measured object and the refractive index of the sample.

17. The spherical-aberration correction method according to claim 15, wherein the spherical aberration is corrected by turning an incident beam of light on the objective lens into a divergent beam of light.

18. The spherical-aberration correction method according to claim 17, wherein the spherical aberration is corrected by turning an incident beam of light on the objective lens into a divergent beam of light, and changing the distance between the objective lens and the sample board.

19. A film-thickness measurement method, comprising: correcting spherical aberration by a spherical-aberration correction method according to claim 15; and measuring a film thickness based on the inside-sample depth of the measured object.

20. A shape measurement method, comprising:
moving the sample board in the direction of the optical axis of the objective lens, and also moving the sample board in directions perpendicular to the optical-axis direction;
correcting spherical aberration by a spherical-aberration correction method according to claim 15; and
measuring the shape of the measured object by measuring the inside-sample depth of the measured object in width directions.

* * * * *